(12) United States Patent
Liskow

(10) Patent No.: US 7,526,872 B2
(45) Date of Patent: May 5, 2009

(54) PASS-THROUGH GAGE AND METHOD OF GAGING A WORKPIECE

(75) Inventor: Karl J. Liskow, Ypsilanti, MI (US)

(73) Assignee: Control Gaging, Inc., Ann Arbor, MI (US)

( * ) Notice: Subject to any disclaimer, the term of this patent is extended or adjusted under 35 U.S.C. 154(b) by 178 days.

(21) Appl. No.: 10/579,816

(22) PCT Filed: Nov. 18, 2004

(86) PCT No.: PCT/US2004/038759

§ 371 (c)(1),
(2), (4) Date: May 16, 2006

(87) PCT Pub. No.: WO2005/049244

PCT Pub. Date: Jun. 2, 2005

(65) Prior Publication Data

US 2007/0089314 A1    Apr. 26, 2007

Related U.S. Application Data

(60) Provisional application No. 60/523,027, filed on Nov. 18, 2003.

(51) Int. Cl.
*G01B 3/00* (2006.01)

(52) U.S. Cl. ............................ 33/555.1; 33/549; 33/555

(58) Field of Classification Search ................ 33/555.1, 33/549–555, 568
See application file for complete search history.

(56) References Cited

U.S. PATENT DOCUMENTS

| | | | | |
|---|---|---|---|---|
| 2,368,796 A | * | 2/1945 | Ardell | 209/533 |
| 3,554,249 A | * | 1/1971 | Arnelo et al. | 144/357 |
| 4,528,651 A | | 7/1985 | Brock et al. | |
| 5,099,585 A | * | 3/1992 | Liskow | 33/783 |
| 5,208,997 A | * | 5/1993 | Tas | 33/783 |
| 5,643,049 A | | 7/1997 | Liskow | |
| 6,349,755 B1 | | 2/2002 | Sardo | |
| 6,645,047 B1 | * | 11/2003 | Liskow | 451/9 |
| 7,043,851 B1 | * | 5/2006 | Le | 33/568 |
| 2006/0248960 A1 | * | 11/2006 | Liskow et al. | 73/856 |

* cited by examiner

*Primary Examiner*—Christopher W. Fulton
(74) *Attorney, Agent, or Firm*—Brinks Hofer Gilson & Lione

(57) ABSTRACT

A gage assembly for measuring a generally cylindrical workpiece. The gage assembly includes a support member and a gage block subassembly located opposite of the support member. The subassembly includes a moveable contact located in spaced relation from the support member so as to define a gaging space therebetween. A measuring device is coupled to the contact and a part handling member, coupled to an actuator, moves the workpiece from a first side of the gaging space to a position where the workpiece is in the gaging space and subsequently to a position where the workpiece is on an opposing side of the gaging space, passing the workpiece between said support member and said gage block subassembly. In its method of operation, the workpiece is dynamically gaged by the gage assembly.

19 Claims, 6 Drawing Sheets

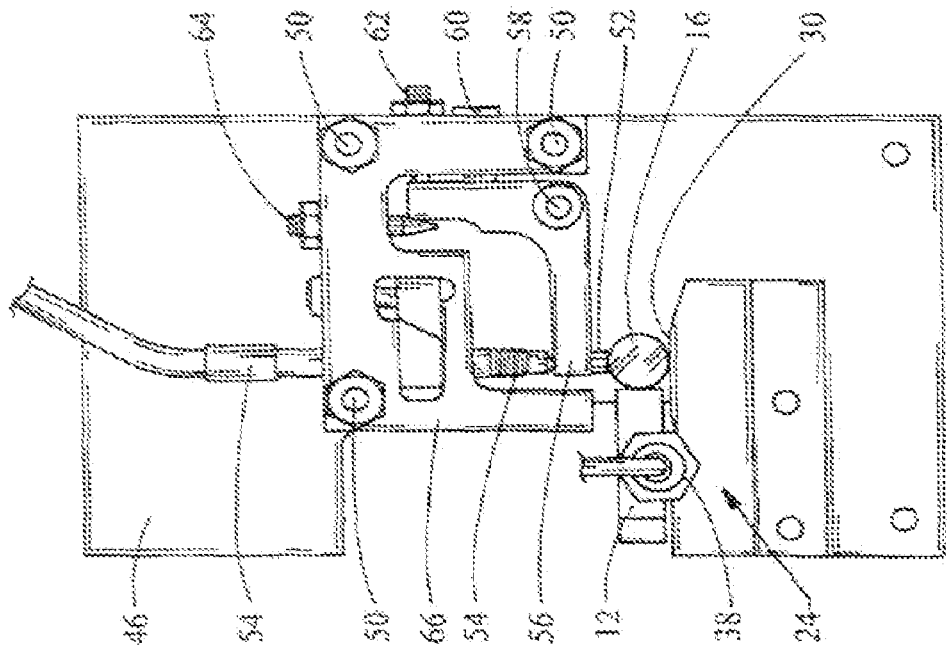
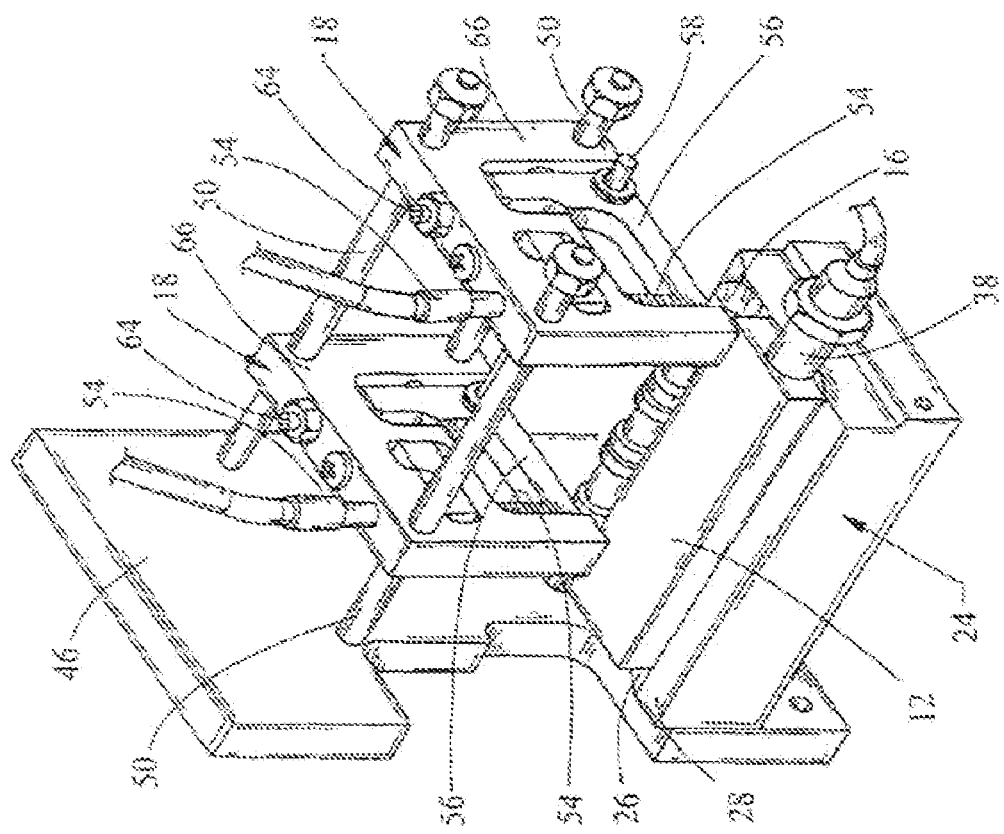

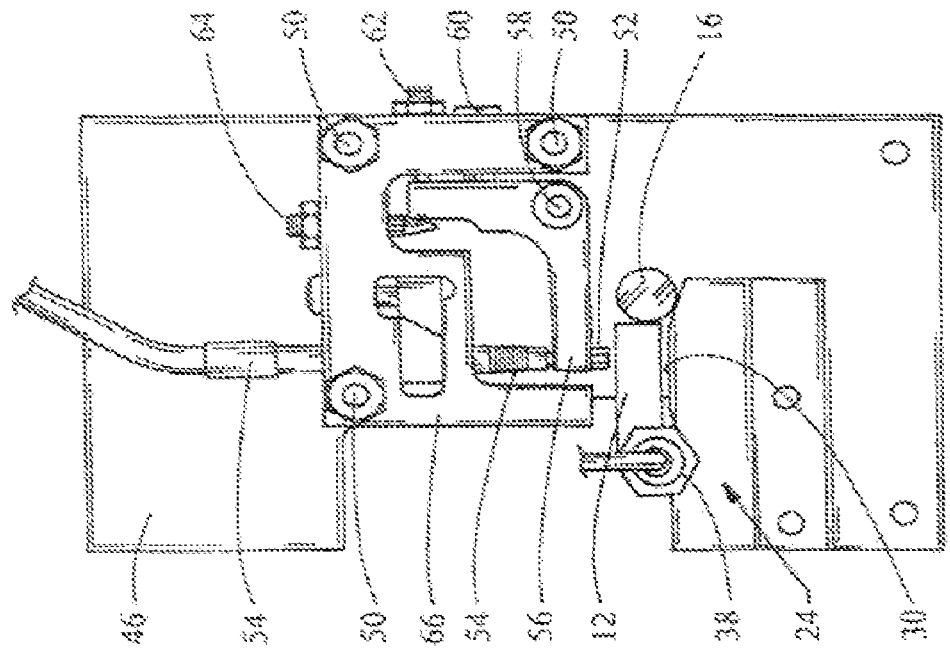
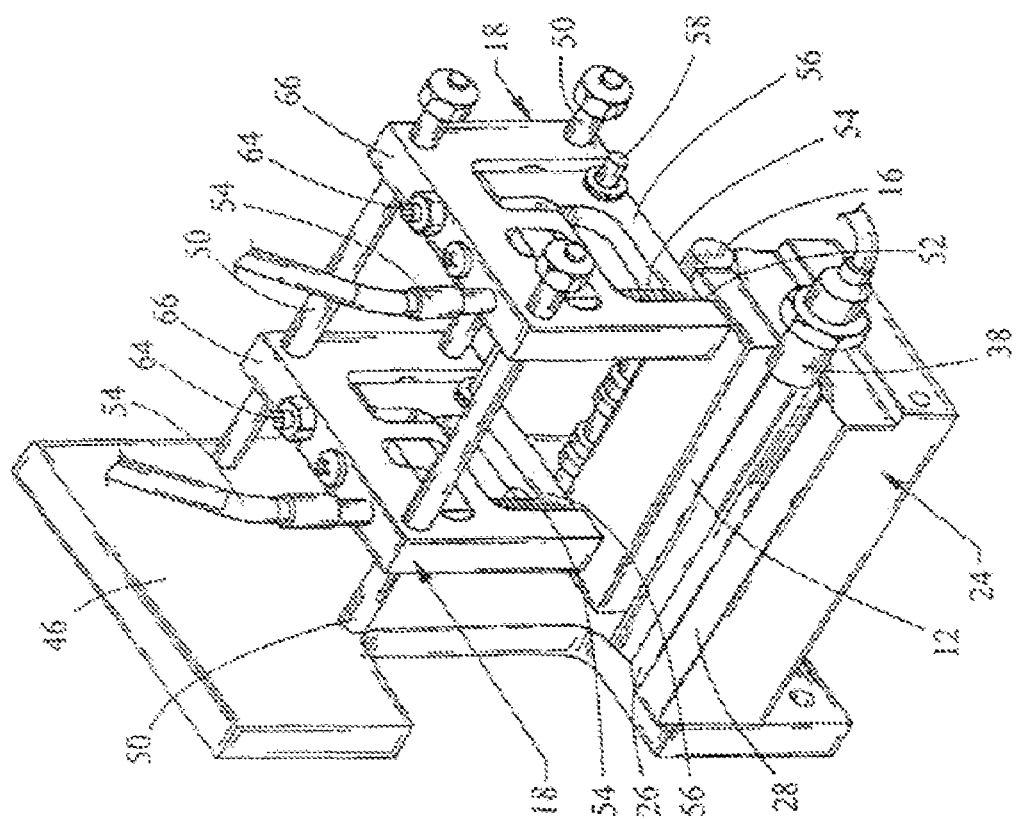

PASS-THROUGH GAGE AND METHOD OF GAGING A WORKPIECE

CROSS-REFERENCE TO RELATED APPLICATION

This application claims, under 35 U.S.C. 119(e), the benefit of U.S. provisional patent application No. 60/523,027 filed on Nov. 18, 2003.

BACKGROUND

1. Technical Field of the Invention

The present invention generally relates to the gaging of workpieces and more particularly to a gage designed to measure multiple diameters on a workpiece without the need for special part fixturing. As such, it is particularly useful as a post-process gage after a workpiece has been ground in an infeed centerless grinding process or other grinding process.

2. Related Technology

Numerous high precision components must be gauged to determine if their dimensional tolerances fall within an acceptable range prior to release to the end customer. An example of one such part is the hydraulic spool valves found in automotive transmissions. These spool valves are generally cylindrical in shape and include a series of raised and recessed lands formed thereon. The dimensions of these raised lands are critical since the valves slide within precisely dimensioned bores within the transmission assembly itself. If the lands are not properly dimensioned, performance of the transmission assembly may suffer or the transmission assembly may fail. Since a specific spool valve would be utilized in a large number of vehicles, should the manufacturing line machining these spool valves be in error, the end result is a large number of defective transmission assemblies.

In order to minimize the likelihood of a machining operation deteriorating to a point where the spool valves are out of compliance with the required dimensional tolerances, the current practice is to individually gage each and every spool valve. In gaging these parts, the spool valve is delivered to a gage assembly where the workpiece is fixtured and, then, an analysis of its dimensions is performed. After gauging, the spool valve is removed from the fixture and either passed through to an accepted parts bin or a rejected parts bin. If a series of parts deviating from the desired dimension are found to exist from a particular grinding station, then the grinding station can be identified for appropriate adjustment (automatic or manual) or for repairs.

Obviously, the individual fixturing and gaging of every workpiece is a time consuming and expensive proposition.

In view of the above there exists a need for a gage assembly where special fixturing of the workpiece is not required and wherein the cycle time in which to gage the workpiece is reduced.

SUMMARY

In overcoming the limitations of the known technology, the present invention provides a gage where the workpiece enters the gage via an inclined chute, allowing the workpiece to slide along the chute by gravity or other means. Upon entering the gage, the workpiece comes to a rest on a shallow V-block. At this point the workpiece is detected by a proximity sensor located at the low end of the V-block. A part handling slide, with approximately shaped soft tooling, pushes or pulls the workpiece laterally from the V-block and passes the workpiece through the gage. The workpiece is continuously moved or passed through the gage by the slide. As the workpiece is being passed through the gage, readings of the workpiece's diameter in one or more, and preferably at least two, locations are taken.

The gage itself includes carbide rails provided at two locations under the part. The locations are chosen to support the part near each end. A gage block subassembly is spaced above and may be located so as to oppose the rails at each location. Each gage block subassembly includes a pivoting contact backed by a common pencil probe. The gage block subassembly produces diameter readings at each location as the workpiece passes between the rails and thereby contacts and affects displacement of the contact and the probe. Peak values at each location are recorded by the software in the gage electronics to determine the desired attributes of the workpiece.

The gage fixture itself includes two or more of the gage block subassemblies located opposite the support rails. The gage block subassemblies are assembled into the fixture at the desired locations with a series of appropriately sized shims that are sized and spaced to create a gage assembly that matches the geometry or desired location of measurement of the workpiece. These same shims also support a pivot shaft that is common to all of the pivoting contacts of all the gage block subassemblies. The entire stack of shims and gage block subassemblies are held together by drawbolts that pass through the assembly from end plates located at each end of the stack. The end plates could also support the carbide rails.

Each gage block subassembly has an adjustable spring to set the force exerted by the contact to a value that stabilizes the workpiece precisely as it is passed through the gage. With the part so stabilized, it is also possible to place, as suggested above, additional gage block subassemblies at locations other than those directly opposing the rails. These additional gage block subassemblies will also generate useful diameter readings that may be used to verify the amount of taper, hourglass, or barrel profile that may exist along the part. It is noted that this can only be achieved by assuming certain attributes of the workpieces processed by the grinding process. Specifically, the runout and out of round values must be small in relationship to the diameter tolerance being measured.

The gages located at some distance from either of the two support rails are actually measuring the radial distance from the true centerline of the part as it sits on the rails. Because of this, the gage electronics must compensate these readings by a factor generated from the geometric information obtained by the two gages opposing the support rails. For instance, if both support diameters fall near the minimum workpiece size tolerance, the actual centerline of the workpiece will pass through the gage at a height lower than that of a mean sized part by an amount equal to half of this tolerance. All the gages that have no support rail under them must be compensated by this amount to arrive at a true reading. The gage electronic software can readily accomplish this task if the accuracy of the application requires it.

Further objects, features and advantages of this invention will become readily apparent to a person skilled in the art after a review of the following description, with reference to the drawings and claims that are appended to and form a part of this specification.

BRIEF DESCRIPTION OF THE DRAWINGS

FIG. 4 is a perspective view, similar to that of FIG. 3, illustrating the workpiece having been moved into a gaging position within the gage assembly;

FIG. 5 is a partial side view of the gage assembly illustrated in FIG. 4;

FIG. 6 is a partial perspective view, similar to FIGS. 3 and 4, illustrating the workpiece having been completely moved through the gage assembly;

FIG. 7 is a partial side elevational view of the gage assembly illustrated in FIG. 6.

DETAILED DESCRIPTION OF THE INVENTION

Figure 1:
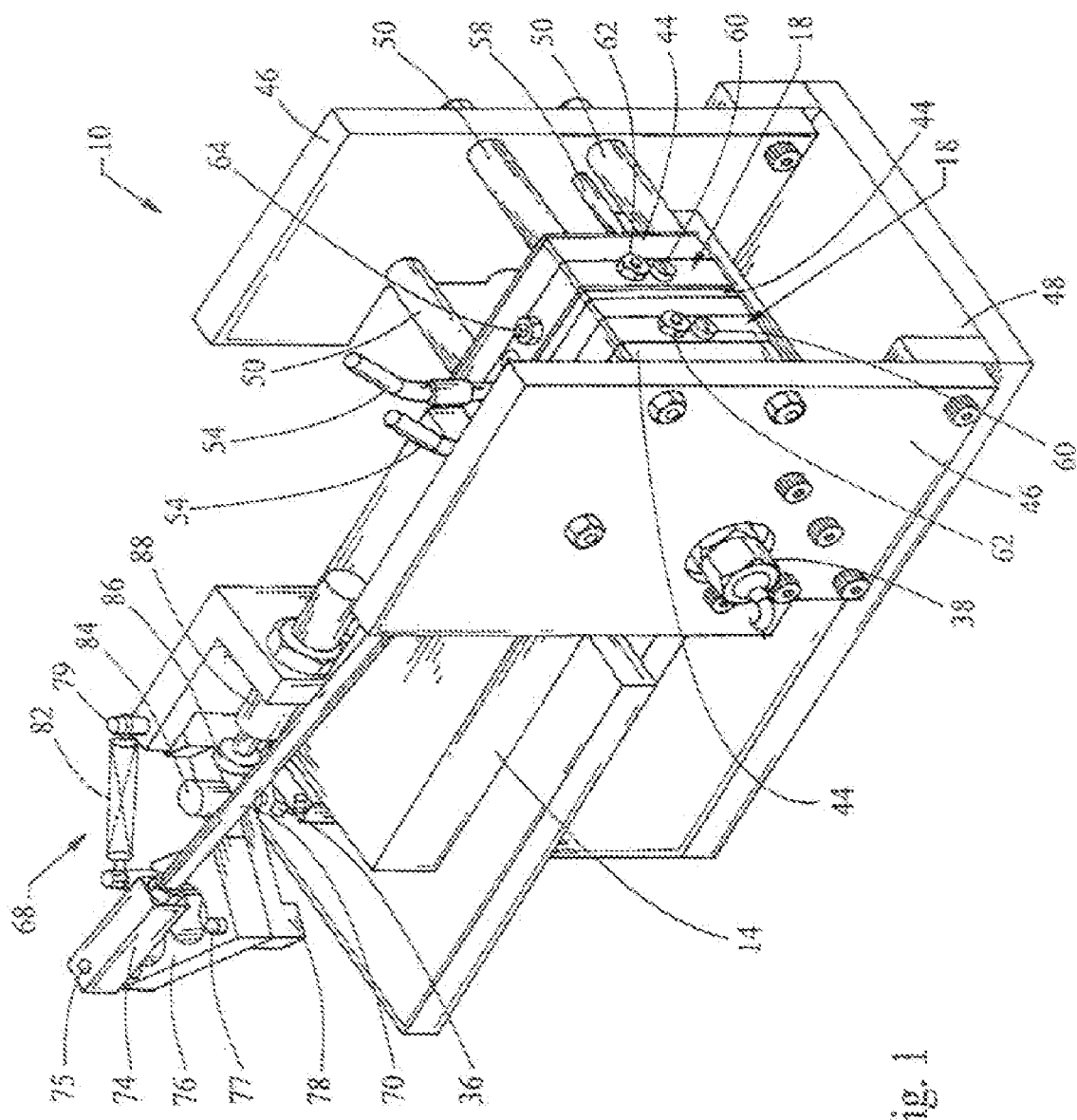
FIG. 1 is a perspective view of a gage assembly embodying the principles of the present invention.
Figure 2:
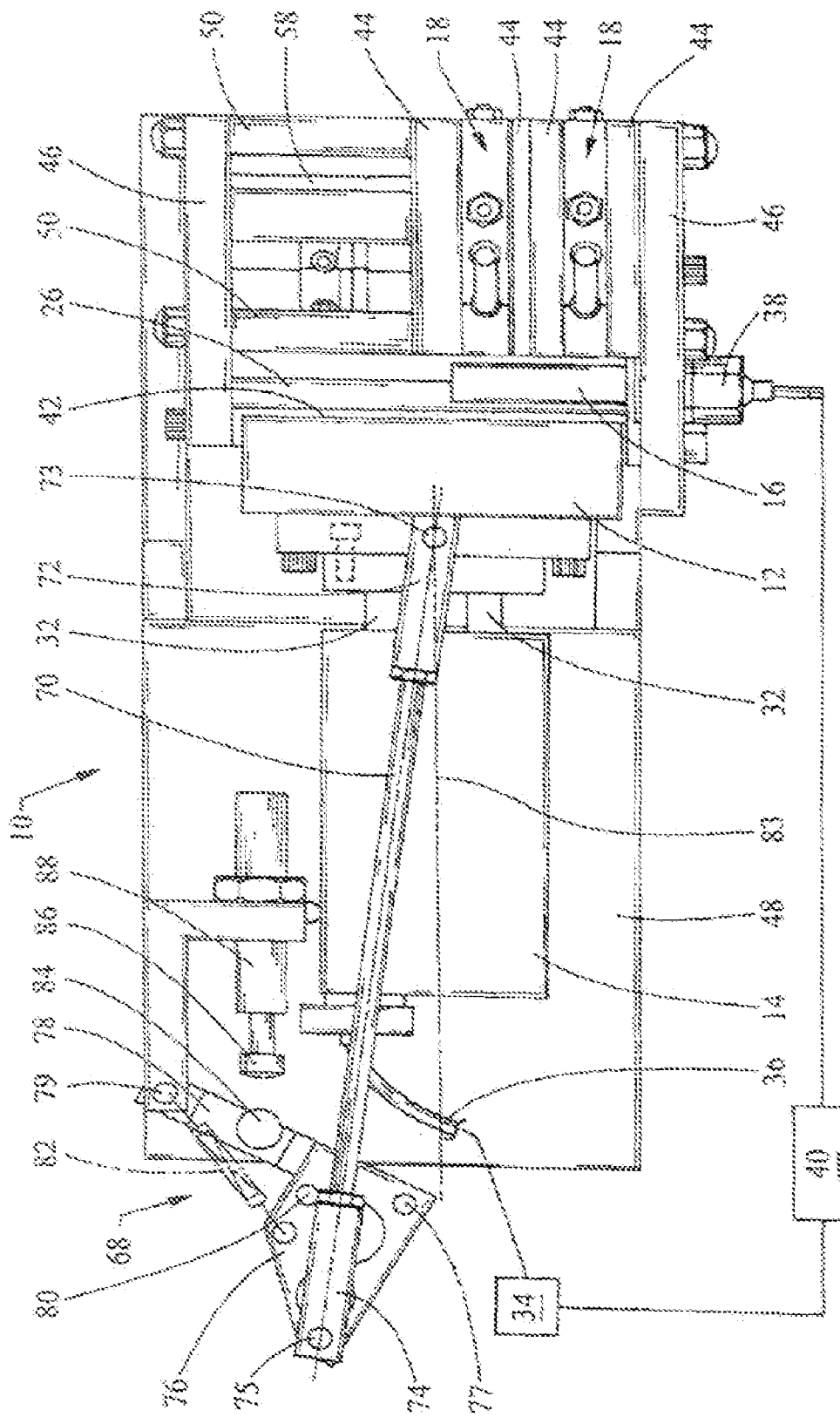
FIG. 2 is a top plan view of the gage assembly illustrated in FIG. 1.
Figure 3:
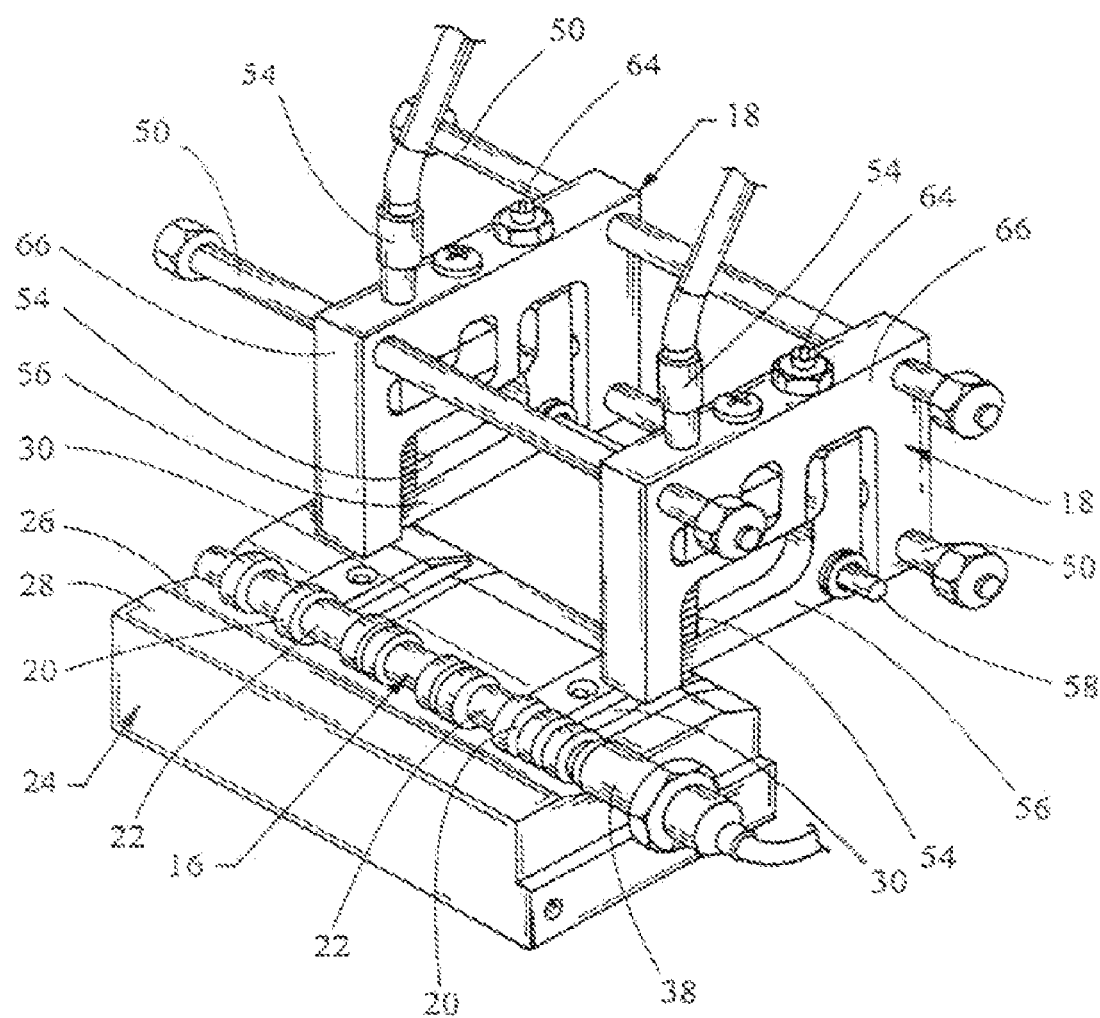
FIG. 3 is a partial perspective view of the gage assembly illustrated in FIG. 1 and showing a workpiece in an initially received position prior to entering into the gaging areas of the assembly.

Referring now to the drawings, seen in FIGS. 1 and 2 is a gage assembly embodying the principles of the present invention and generally designated at 10. The gage assembly 10 includes as its primary components a part handling slide 12 and an actuator 14. The actuator 14 and part handling slide 12 cooperate with each other to cause movement of a workpiece 16 through a pair of gage block subassemblies 18 where readings of the workpiece's diameter in one or more, and preferably at least two, locations is taken.

For simplicity in the figures, the workpiece is at times only illustrated as a cylindrical workpiece. Such a depiction of the workpiece 16 is seen in FIG. 2. At other times, the workpiece 16 is depicted as a spool valve having a series of raised lands 20 and recessed lands 22. In that the dimension of the raised lands 20 is critical to the operation of the spool valve 16, the diameter of the raised lands 20, preferably of least two of the raised lands 20, is the critical dimension measured by the gage assembly 10. Additionally, in certain figures portions of the gage assembly 10 is omitted for clarity.

The workpiece 16 is provided to the gage assembly 10 by a workpiece delivery means such as an inclined chute allowing the workpiece 16 to slide, under the influence of gravity, to the gage assembly 10. At the gage assembly 10, the workpiece 16 is received into a vee-block 24. As per its name, the vee-block 24 has defined therein a shallow recess 26 that is in the shape of a "v". Obviously, the recess 26 may be provided with alternative shapes. The recess 26 extends the width of the vee-block 24 and may be inclined along its length, from one end of the recess 26 to the other, so as to insure that the workpiece 16 is fully received onto the upper surface 28 of the vee-block 24.

Also provided in the vee-block 24 are at least two supports 30. The location of the supports 30 are preferably chosen so that they support the workpiece 16 near the ends thereof. Additionally, the supports 30 define the locations in which, at a minimum, measurements of the workpiece 16 will be taken.

The supports 30 themselves are in the form of rails received in mounting blocks, and the rails are preferably constructed of a material exhibiting extremely low wear characteristics. One preferred material is carbide. Additionally, the uppermost surface of the supports 30 are provided such that these surfaces of the supports 30 are elevated relative the upper surface 28 of the vee-block 24. This is readily seen in FIGS. 5 and 7.

As previously mentioned, the part handling slide is constructed of a soft tooling, for example polyethylene, and is coupled to the actuator 14 so as to be moveable in a direction generally transverse to the length or longitudinal axis of the recess 26 formed in the vee-block 24. Thus, the direction of movement of the part handling slide 12 is in the direction of the longitudinal axis of the supports 30, which is transverse to the longitudinal axis of the workpiece 16. The part handling slide 12 rests generally above or on the upper surface 28 of the vee-block 24 and is moveable thereacross as a result of the advancement of the connector rods 32 of the actuator 14. The actuator 14 may be any variety of actuator heretofore or hereafter devised. As illustrated, the actuator 14 is a pneumatic actuator coupled to a pneumatic source 34 via a coupling line 36. In addition to advancing the part handling slide 12, the actuator 14 similarly causes retraction of the part handling slide 12 as is conventionally known to be done.

Upon receipt of a workpiece 16 within the end of the recess 26 of the vee-block 24, the receipt of the workpiece 16 is detected by a proximity sensor 38 appropriately positioned with respect to the end of the recess 26 in the vee-block 24. The proximity sensor 38 provides a signal indicating the presence of a workpiece 16 to a controller 40, which in turn causes advancement of the actuator and the part handling slide 12 via the pneumatic source 34. With advancement of the part handling slide 12, the leading edge 42 of the slide 12 engages the workpiece 16 and laterally moves the workpiece 16 out of the recess 26 of the vee-block 24. This advancement causes the workpiece 16 to move out of the recess 26 and onto the upper surfaces of the supports 30 and subsequently it is advanced between the supports 30 and the gage block subassemblies 18.

The gage block subassemblies 18 are located opposite of the supports 30, as mentioned above, and are provided as such through the use of appropriately sized shims and spacers 44. In this manner, the location of the gage block subassemblies 18 matches the geometry or desired locations of measurement of the workpiece 16. In order to locate the gage block subassemblies 18 and shims and spacers 44, the entire stack of gage block subassemblies 18, shims and spacers 44 are held between end plates 46 extending upward from a base 48 of the gage assembly 10. As readily seen in FIGS. 2-4, and 6, drawbolts 50 facilitate this holding of component and pass through the gage block subassemblies 18, shims and spacers 44, as well as the end plates 46 themselves. The vee-block 24 and supports 30 may additionally be held in position by the end plate 46.

Figure 8:
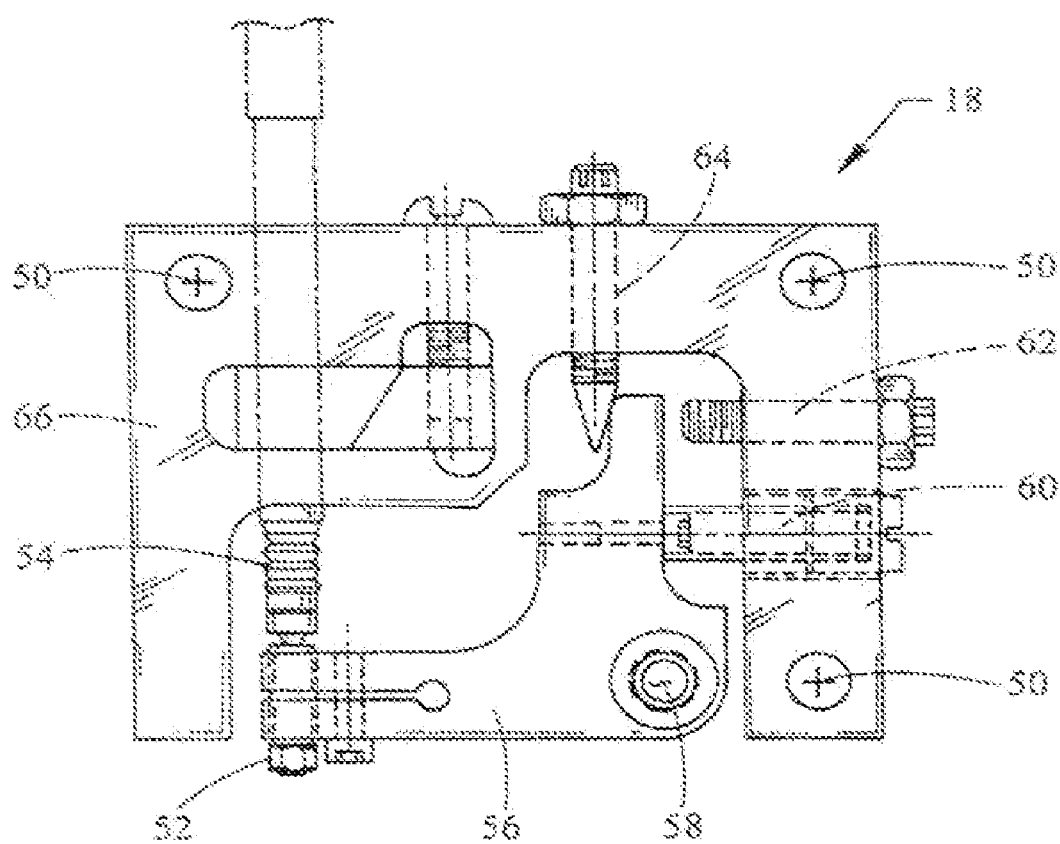
FIG. 8 is an enlarged side elevational view of a gage block subassembly similar to those illustrated in FIGS. 3-7.
Figure 9:
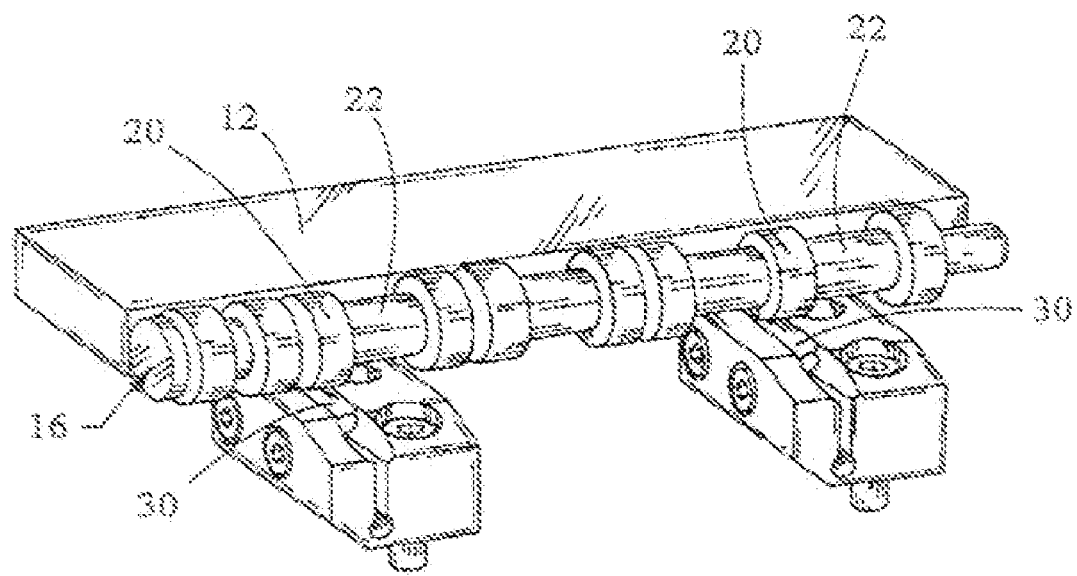
FIG. 9 is a perspective view of the part handling slide and support rails, with a workpiece resting thereon, with the remainder of the gage assembly being omitted for clarity.

Each gage block subassembly 18 includes a contact 52 backed by a probe 54, such as a common pencil probe. The contact 52 is supported on a pivot arm 56 through which is provided a pivot shaft 58. The pivot shaft 58 extends through and is common to all of the gage block subassemblies 18, as well as the shims and spacers 44, and is supported in the end plate 46. As best seen in FIG. 8, each gage block subassembly 18 is provided with an adjustment spring 60. The purpose of the adjustment spring 60 is to set and provide precise adjustment of a contact force exerted by the contact 52. This contact force is adjusted to a value that stabilizes the workpiece 16 as it enters and passes through the gage. Such adjustment springs 60 are well known in the industry and therefore further detail regarding its construction is not provided herein. In addition to the adjustment spring 60, the gage block subassemblies 18 may also include stop pins 62, 64, whose positions define the limits of travel of the pivot arm 56 on the pivot shaft 58.

Upon exiting of the recess 26, the workpiece rides up onto the upper surface of the supports 30 and enter beneath the gage block subassemblies 18, where the top most portion of the workpiece engages the contact 52 of each gage block subassembly 18. In response thereto, the pivot arm 56 is caused to pivot and the probe 54 detects this movement and produces diameter readings as the workpiece 16 passes between the supports 30 and the contacts 52. Software provided in a personal computer or other appropriate device records the peak values at each measured location and determines the desired attributes of the workpiece 16, including, without limitation, the diameter of the workpiece 16 at each of the investigated locations. In order to prevent any movement of the probes 54, the probes 54 are rigidly supported in a fixed and immoveable subframe 66 of the gage block subassembly 18.

As seen in FIGS. 4 and 5, the workpiece 16 has been moved by the part handling slide 12 to a location where the workpiece 16 is located on the supports 30 and is immediately beneath the contacts 52 of the gage block subassemblies 18. The workpiece 16 is thereafter moved by the part handling slide 12 such that it has proceeded from one side (the entry side) of the contact 52 to the other side (the exit side) of the contact 52. This latter positioning of the workpiece 16 is generally illustrated in FIGS. 6 and 7. At this point the measurements of the workpiece 16 have been taken and the workpiece is thereafter provided onto a part handling outfeed conveyor or other means for transporting the workpiece 16 from the gage assembly 10. The part handling conveyor may include a construction allowing for workpieces 16 not meeting the dimensional tolerances to be rejected to a discarded or scrap parts bin.

While only two gage block subassemblies 18 are illustrated in the various drawings, it will be readily appreciated that additional gage block subassemblies 18 can be provided in the gage assembly 10 at locations other than immediately above the supports 30. In such instances, the additional gage block subassemblies 18 can generate radial readings that may be used to estimate a diameter or to verify any profiles, such as taper, hourglass or barrel, that may exist along the length of the part. Alternatively, two gage block subassemblies 18 may be provided in an opposed fashion.

In the illustrated figures, while the workpiece 16 is shown in three locations, namely within the recess 26 of the vee-block 24; immediately between the contact 52 and support 30 and at a point of discharge from the gage assembly 10, it should be understood that the movement of the workpiece 16 through the gage assembly 10 is of a continuous motion. In other words, the workpiece is always moved through the gage assembly 10 and does not discretely stop at any point in the gage assembly other than its receipt in the recess 26 of the vee-block 24 prior to advancement by the part handling slide 12. By continuously moving and dynamically gaging the workpiece 16, faster cycle times for workpieces 16 can be achieved over prior art gage assemblies, which require static gaging with a discrete and special fixturing of the workpiece 16. Such prior assemblies first require the specific placing of the workpiece in the gage assembly, then require the measuring of the workpiece by the gage assembly, and finally the removal of the workpiece from the gage assembly by a takeout assembly. Each of the aforementioned steps delays and slows the cycle time for the gauging of a workpiece. In an industry where every workpiece is individually gauged to make sure it meets tolerance requirements, any decrease in cycle time for the gauging process is a major advancement in the production of the parts.

While the workpiece 16 is preferably dynamically gaged and continuously moved through the gage assembly 10, this should not be interpreted to mean that the workpiece 16 is has to be continuously moved through the gage assembly 10 or that such movement has to be at a constant rate. While it would decrease cycle times and is not necessary, the workpiece 16 could momentarily dwell at a specific location while passing through the gage assembly 10. The rate at which the workpiece 16 is moved through the gage assembly 10 can also be valued so that the rate of movement of the workpiece 16 decreases when it is in contact, or immediately before contact, with the contact 52. To facilitate this type of movement, the gage assembly 10 seen in FIGS. 1 and 2 is provided with a retarder mechanism 68 to allow for a varying of the rate at which the workpiece 16 is continuously moved through the gate assembly 10.

The construction of the retarder 68 is such that initial movement of the part handling slide 12, and thus the workpiece 16, is at an uninhibited rate as provided by the actuator 14. Upon approaching the contact 52, advancement of the part handling slide 12 is slowed or retarded. Upon movement of the workpiece 16 beyond the contact 52, advancement of the part handling slide and workpiece 16 is again increased facilitating discharge of the workpiece 16 from the gage assembly 10.

To facilitate the above, a connecting arm 70 is provided with its distal end attached via a pivot 73 to the part handling slide 12 or the structure coupling the part handling slide 12 to the connecting rods 32 of the actuator 14. A proximal end 74 of the connecting arm 70 is pivotally supported at 75 on a pivot block 76. The pivot block 76 is in turn rotatably mounted at 77 to a primary pivot arm 78 which is further rotatably supported at 79 to the base 48 of the gage assembly 10. Relative rotation of the pivot block 76 relative to the primary pivot arm 78 is limited by a stop 80, provided in the pivot block 76 so as to interferingly engage the primary pivot arm 78 and thereby limit rotation of the pivot block 76 relative to the primary pivot arm 78. A biasing member 82, such as tension spring or similar structure, is provided between the pivot block 76 and the pivot 79, base 48 or other fixed structure. The biasing member 82 exerts a biasing force on the pivot block 76 and primary pivot arm 78 such that the stop 80 is urged into contact with the primary pivot arm 78, thereby urging the pivot block 76 and primary pivot arm 78 into a biased or initial position.

Upon initial advancement of the part handling slide 12 by the actuator 14, the connector arm 70 advances and the pivot block 76 and primary pivot arm 78 are generally moved in unison, arcuately, but generally in the same direction as the part handling slide 12. This movement in unison occurs because of the positioning of the pivot 75 (the pivot 75 of the connector arm 70 and the pivot block 76) inside of the pivot 77 (the pivot 77 of the pivot block 76 and primary pivot arm 78), relative to a line 83 drawn through the pivot 73 and parallel to the direction of movement of the part handling slide 12. During this initial advancement, the proximal end 74 of the connecting arm 70 pivots at 75 with respect to the pivot block 76. Before the workpiece 16 engages the contact 52, the primary pivot arm 78, via a boss 84, cam follower or other structure thereon, engages the plunger 86 of a shock absorber 88. The shock absorber 88 is of a common construction and resists depression of the plunger 86 into it. This resistance is provided in an amount that is sufficient to counter act the force of the actuator 14 and thus retard advancement of the part handling slide 12. The counter force of the shock absorber 88 is not, however, sufficient so as to completely inhibit and stop advancement of the actuator 14 and part handling slide 12. Rather, movement of the part handling slide 12, and therefore the workpiece 16, is merely slowed down. This retarded movement of the workpiece 16 occurs until the workpiece 16 has cleared the contact 52. At this point, the primary pivot arm 78 has been rotated past perpendicular to the linear direction of movement of the part handling slide 12. Further advancement of the part handling slide 12 causes the pivot 75 to be moved to a point where it is located outside of the pivot 77 between the pivot block 76 and primary pivot arm 78, relative to the line 83 drawn through the pivot 73 and parallel to the direction of movement of the part handling slide 12. With the pivot 75 in an over center position with respect to the pivot 77 and line 83, the pivot block 76 can rotate relative to the primary pivot arm 78 allowing the connector arm 70 to advance unencumbered by the shock absorber 88. It is noted that the biasing member 82 is sufficiently weak so as to be overcome by the force exerted by the actuator 14. As a result, the rate of movement of the part handling slide 12 as generated by the actuator 14, and therefore the workpiece 16, is increased.

With the workpiece 16 ejected from the gage assembly 10, the actuator 14 retracts the part handling slide 12 and the retarder 68 resets. Once the part handling slide 12 has been retracted beyond the recess 26 of the vee-block 24 the next workpiece is delivered into the recess 26 and the process of gauging that workpiece begins with advancement of the part handling slide 12.

As a person skilled in the art will readily appreciate, the above description is meant as an illustration of implementation of the principles of this invention. This description is not intended to limit the scope or application of this invention, particularly since the invention is susceptible to modification, variation and change without departing from spirit of this invention, as defined in the following claims.

What is claimed is:

1. A gage assembly for measuring a generally cylindrical workpiece defining a longitudinal axis, said gage assembly comprising:
   at least one non-moving support member defining a support surface;
   at least one gage block subassembly generally opposing said support surface and having a moveable contact located in spaced relation from said support surface so as to define a gaging space therebetween, said contact being moveable in a direction toward said support surface, said gage block assembly also including a measuring device coupled to said contact; and
   a part handling member coupled to an actuator, said actuator adapted to transversely move said part handling member from a position contacting the workpiece on a first side of said gaging space to a position where the workpiece is in said gaging space and to a position where the workpiece is on an opposing side of said gaging space, whereby the workpiece is transversely passed between said support member and said gage block subassembly.

2. The gage assembly of claim 1 wherein said part handling member is moved in a direction along a support axis defined by said at least one support member, said support axis being transversely oriented relative to the longitudinal axis.

3. The gage assembly of claim 1 wherein said support surface is raised relative to a support block within which said support member is mounted.

4. The gage assembly of claim 1 wherein said part handling member is continuously moveable by said actuator from said first side to said opposing side of said gaging space.

5. The gage assembly of claim 1 wherein said part handling member is moveable in a direction transverse to the longitudinal axis of the workpiece.

6. The gage assembly of claim 1 further comprising a workpiece receiving station located adjacent to said first side of said gaging space, said receiving station including portions defining a workpiece receiving channel oriented transversely to said at least one support member.

7. The gage assembly of claim 6 wherein said workpiece receiving channel is defined by a V-block.

8. The gage assembly of claim 1 further comprising a means for moving said part handling member at a variable rate.

9. The gage assembly of claim 8 wherein said means for moving said part handling member causes movement of said part handling member at a slower rate when the workpiece is in said gaging space than when the workpiece is on said first side of said gaging space.

10. The gage assembly of claim 8 wherein said means for moving said part handling member is a retarder.

11. The gage assembly of claim 10 wherein said retarder includes a shock absorber.

12. The gage assembly of claim 10 wherein said retarder includes a portion rotatable to an over center position.

13. A gage assembly for measuring a generally cylindrical workpiece defining a longitudinal axis, said gage assembly comprising:
   at least one support member defining a support surface, said support member being a rail;
   at least one gage block subassembly generally opposing said support surface and having a moveable contact located in spaced relation from said support surface so as to define a gaging space therebetween, said contact being moveable in a direction toward said support surface, said gage block assembly also including a measuring device coupled to said contact; and
   a part handling member coupled to an actuator, said actuator adapted to transversely move said part handling member from a position contacting the workpiece on a first side of said gaging space to a position where the workpiece is in said gaging space and to a position where the workpiece is on an opposing side of said gaging space, whereby the workpiece is transversely passed between said support member and said gage block subassembly.

14. The gage assembly of claim 13 wherein said rail is of carbide material.

15. The gage assembly of claim 13 wherein said rail is generally round in cross-section.

16. A method of measuring a cylindrical workpiece comprising the steps of:
   providing a generally cylindrical workpiece defining a longitudinal axis therethrough;
   transversely moving the workpiece from a start position into a gaging space defined within a gage assembly;
   transversely measuring the workpiece at least two locations along its length when the workpiece is located in the gaging space;
   transversely moving the workpiece from the gaging space to an exit position where the workpiece is discharged from the gage assembly; and
   wherein the moving steps continuously move the workpiece from the start position, through the gaging position and to the exit position.

17. The method of claim 16 wherein the moving steps move the workpiece at a variable rate.

18. The method of claim 16 wherein the moving steps move the workpiece at a reduced rate at the gaging station than the rate the workpiece is moved from the start position.

19. The method of claim 16 wherein the moving steps move the workpiece at a reduced rate at the gaging station than the rate the workpiece is moved to the exit position.

* * * * *

UNITED STATES PATENT AND TRADEMARK OFFICE
CERTIFICATE OF CORRECTION

| | | |
|---|---|---|
| PATENT NO. | : 7,526,872 B2 | Page 1 of 1 |
| APPLICATION NO. | : 10/579816 | |
| DATED | : May 5, 2009 | |
| INVENTOR(S) | : Karl J. Liskow et al. | |

It is certified that error appears in the above-identified patent and that said Letters Patent is hereby corrected as shown below:

<u>In the Claims</u>

In column 8, claim 16, line 50, after "measuring the workpiece at" insert --at--.

Signed and Sealed this

Eighth Day of December, 2009

David J. Kappos
*Director of the United States Patent and Trademark Office*